(12) United States Patent
Piira et al.

(10) Patent No.: US 8,296,783 B1
(45) Date of Patent: Oct. 23, 2012

(54) MEDIA PLAYER INSTANCE MANAGED RESOURCE REDUCTION

(75) Inventors: Antti Piira, San Francisco, CA (US);
Rishit Shah, Mountain View, CA (US);
Rupen Chanda, San Francisco, CA (US); Gavin Peacock, Walnut Creek, CA (US); Jian Zheng, San Francisco, CA (US); Brent Getlin, Leander, TX (US); Thomas Reilly, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 399 days.

(21) Appl. No.: 12/790,739

(22) Filed: May 28, 2010

(51) Int. Cl.
*G06F 3/00* (2006.01)

(52) U.S. Cl. ........................................ 719/328; 719/330
(58) Field of Classification Search .................. 719/328, 719/330
See application file for complete search history.

(56) References Cited

PUBLICATIONS

Zhang Xidong, A Game-Theoretic Dynamic Power Management Policy on Wireless Sensor Network, Oct. 2006.*

* cited by examiner

*Primary Examiner* — Lechi Truong
(74) *Attorney, Agent, or Firm* — Fish & Richardson P.C.

(57) ABSTRACT

Techniques and systems are disclosed for managing computer resources available to multiple running instances of a media player program. The methods include monitoring consumption of computing resources of multiple running instances of a media player program to render respective media content in a graphical user interface of a computing device. The graphical user interface associated with an additional program configured to render additional content, different from the media content, to the graphical user interface. The additional program can be a browser. The methods further include instructing the multiple instances to reduce respective portions of the computing resources consumption upon determining that a requested increase in computer resources consumption of the media player program would cause the computer resources consumption of the media player program to exceed a first predetermined level.

22 Claims, 12 Drawing Sheets

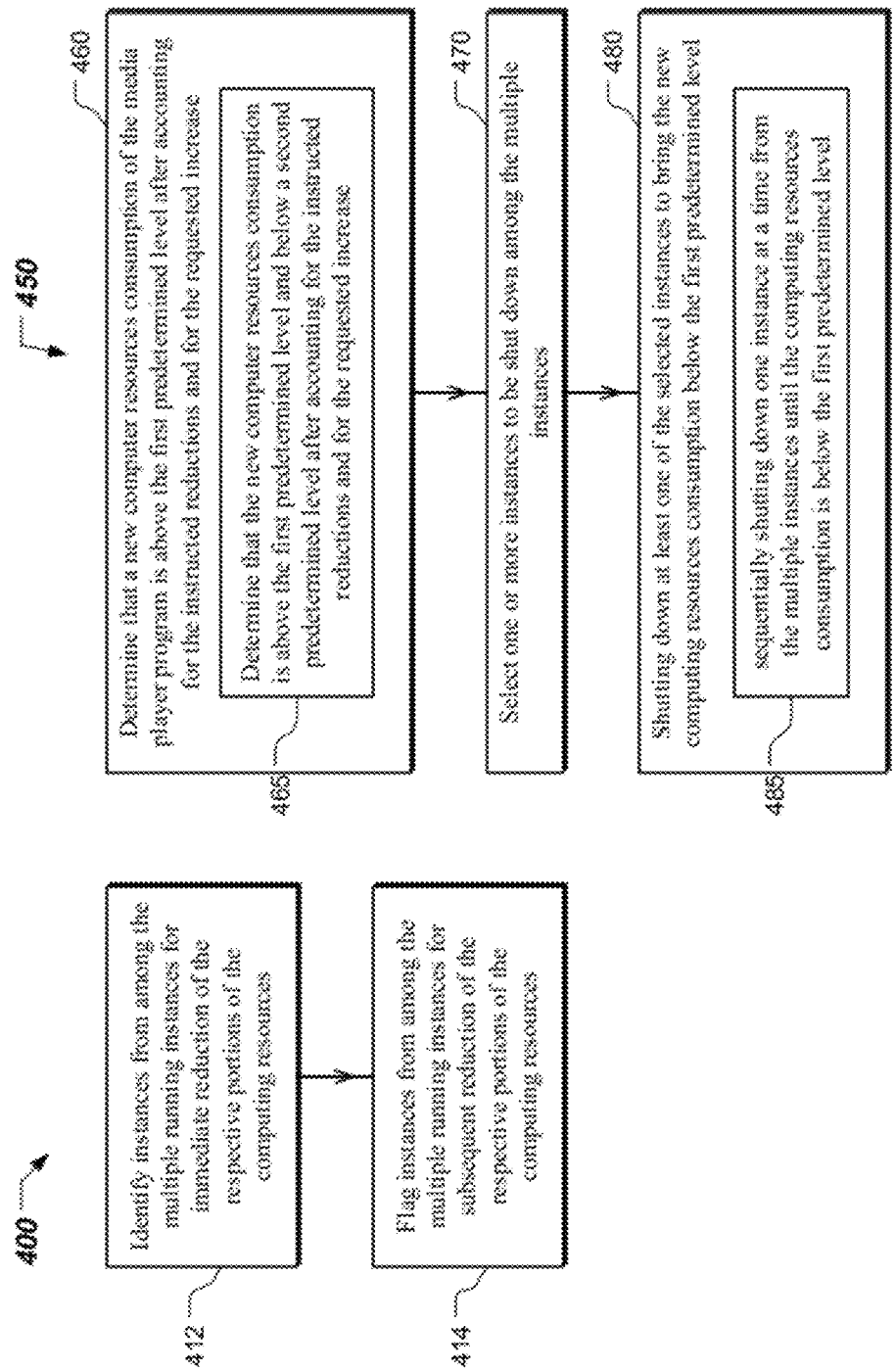

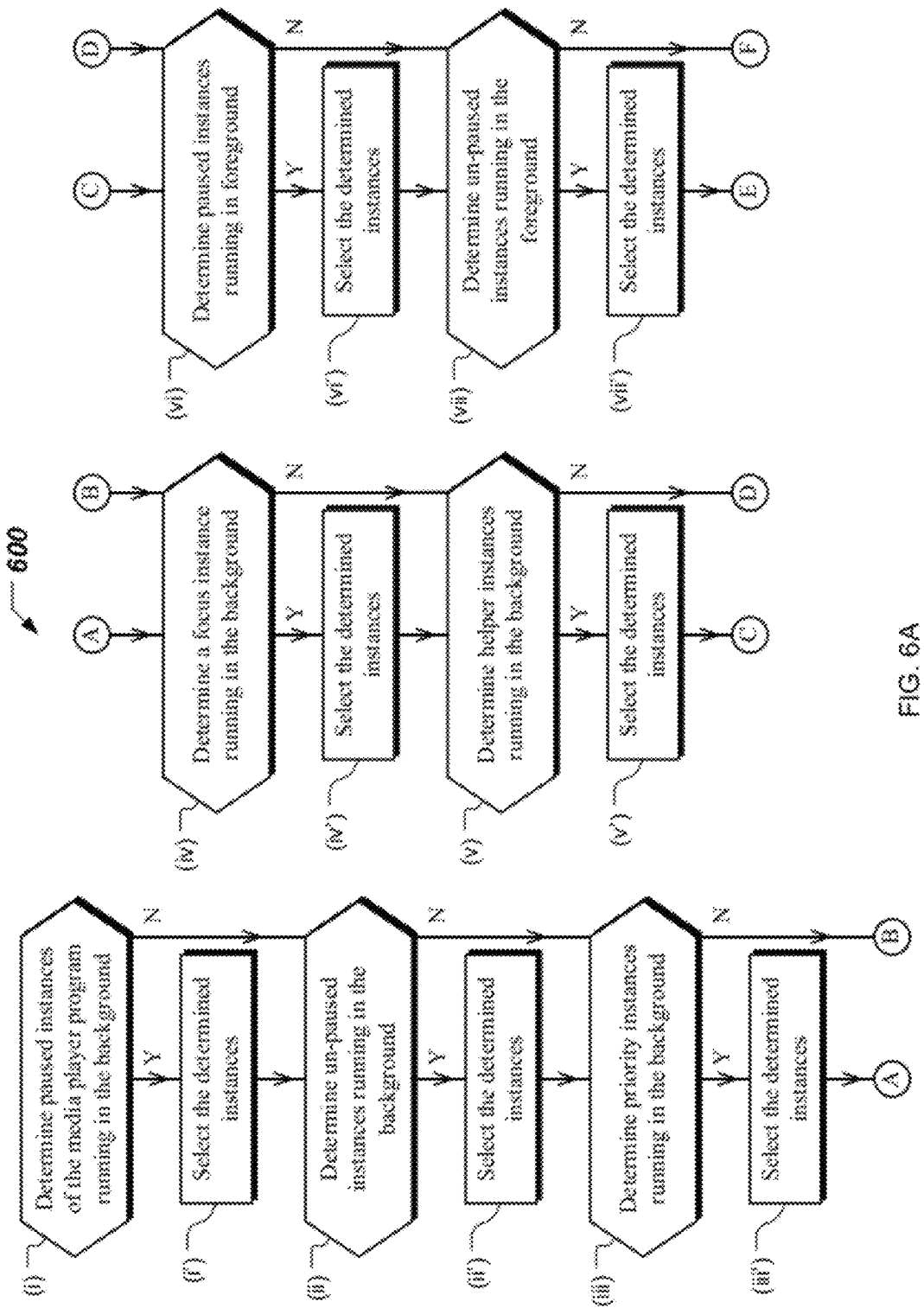

MEDIA PLAYER INSTANCE MANAGED RESOURCE REDUCTION

BACKGROUND

This specification relates to managing computing resources consumed by a media player program, and specifically to reducing the media player program's resources when necessary by instructing individual player instances to reduce resources or to shut down based on a specified priority.

A web browser is a software program for retrieving and presenting information resources on the World Wide Web. An information resource is typically identified by a Uniform Resource Locator (URL) and may be a web page, image, video, or other piece of content. Hyperlinks present in resources enable users to easily navigate their browsers to related resources. Aside from HTML, browser programs can generally display any kind of content that can be part of a web page. Most browser programs can display images, audio, video, and XML files, and often have plug-ins to support media player programs, e.g., Flash applications and Java applets.

There may be situations when multiple instances of a media player program are running in a browser program. Moreover, the browser program hosting the multiple running instances may be executed by a mobile device having limited computing resources.

SUMMARY

This specification describes technologies relating to managing computer resources available to multiple running instances of a media player program. Specifically, techniques and systems are disclosed for selectively shutting down instances of the media player program when computing resources required for running the multiple instances become, or are in danger of becoming unavailable.

In general, one innovative aspect of the subject matter described in this specification can be embodied in methods that include the actions of monitoring consumption of computing resources of multiple running instances of a media player program to render respective media content in a graphical user interface of a computing device. The graphical user interface associated with an additional program configured to render additional content, different from the media content, to the graphical user interface. The additional program can be a browser. The methods further include instructing the multiple instances to reduce respective portions of the computing resources consumption upon determining that a requested increase in computer resources consumption of the media player program would cause the computer resources consumption of the media player program to exceed a first predetermined level.

These and other implementations can include one or more of the following features. Prior to the instructing the methods include, identifying instances from among the multiple running instances for immediate reduction of the respective portions of the computing resources, and flagging instances from among the multiple running instances for subsequent reduction of the respective portions of the computing resources.

The methods can further include determining that a new computer resources consumption of the media player program is above the first predetermined level after accounting for the instructed reductions and for the requested increase. Further, the methods can include selecting one or more instances to be shut down among the multiple instances, and shutting down at least one of the selected instances to bring the new computing resources consumption below the first predetermined level. Determining the new computer resources consumption of the media player program can also include determining that the new computer resources consumption is above the first predetermined level and below a second predetermined level after accounting for the instructed reductions and for the requested increase. Shutting down instances can include sequentially shutting down one instance at a time from the multiple instances until the computing resources consumption is below the first predetermined level.

Selecting the instances can be performed according to one or more rules designed to maximize a number of presentations of the respective media content rendered in the graphical user interface. Selecting the instances further includes (i) determining paused instances of the media player program that are loaded in background, and selecting the determined instances. The background includes portions of the graphical user interface not visible on a display screen. Then, selecting the instances further includes (ii) determining un-paused instances of the media player program running in the background, and selecting the determined instances. Then, selecting the instances includes (iii) determining priority instances of the media player program running in the background, and selecting the determined instances. A priority instance of the media player has a priority assigned by the additional program. Then, selecting the instances includes (iv) determining a focus instance of the media player program running in the background, and selecting the determined instance. The focus instance represents an instance of the media player program which has received most recently an instruction via the graphical user interface. Then, selecting the instances includes (v) determining helper instances of the media player program running in the background, and selecting the determined instances. The helper instances are configured to assist the running of other instances from the multiple instances. Then, selecting the instances includes (vi) determining paused instances of the media player program that are loaded in foreground, and selecting the determined instances. The foreground includes portions of the graphical user interface being visible. Then, selecting the instances includes (vii) determining un-paused instances of the media player program running in the foreground, and selecting the determined instances. Then, selecting the instances includes (viii) determining priority instances of the media player program running in the foreground, and selecting the determined instances. Then, selecting the instances includes (ix) determining a focus instance of the media player program running in the foreground, and selecting the determined instance. Then, (x) determining helper instances of the media player program running in the foreground, and selecting the determined instances. The methods can include performing the sequentially shutting down one instance at a time in order of instance selection.

Shutting down the instances can also include presenting graphical indications of a portion of the shutdown instances, for example, a proxy icon can be displayed in place of a shutdown instance of the media player program. In some implementations, a click-to-play icon of a shut-down instance can be displayed.

According to another aspect, the described subject matter can also be implemented in a data processing system including a data storage device to store one or more rules for managing consumption of computing resources by multiple running instances of a media player program configured to render respective media content in a graphical user interface of the data processing system. The graphical user interface associated with an additional program is configured to render additional content, different from the media content, to the graphical user interface. The additional program can be a browser. The system also includes one or more hardware processors communicatively coupled with the data storage device and configured to perform operations including monitoring the consumption of computing resources of the multiple running instances of the media player program, and instructing the multiple instances to reduce respective portions of the computing resources consumption upon determining that a requested increase in computing resources consumption of the media player would cause the computing resources consumption of the media player to exceed a first predetermined level. The computing resources can include one or more of (i) memory available to the multiple running instances of the media player program, and (ii) power of the one or more hardware processors consumed by the multiple running instances of the media player program.

These and other implementations can include one or more of the following features. The one or more hardware processors are further configured to perform, prior to carrying out the instructing, operations including identifying instances from among the multiple running instances for immediate reduction of the respective portions of the computing resources, and flagging instances from among the multiple running instances for subsequent reduction of the respective portions of the computing resources.

The one or more hardware processors are further configured to perform operations including determining that a new computer resources consumption of the media player program is above the first predetermined level after accounting for the instructed reductions and for the requested increase. Selecting one or more instances to be shut down among the multiple instances, and shutting down at least one of the selected instances to bring the new computing resources consumption below the first predetermined level.

To carry out the determining, the one or more hardware processors are further configured to perform operations including determining that the new computer resources consumption is above the first predetermined level and below a second predetermined level after accounting for the instructed reductions and for the requested increase. To carry out the shutting down, the one or more hardware processors are further configured to perform operations including sequentially shutting down one instance at a time from the multiple instances until the computing resources consumption is below the first predetermined level.

The selecting can be carried out by the one or more hardware processors in accordance with the stored one or more rules for managing the multiple running instances of the media player program. The one or more rules are designed to maximize a number of presentations of the respective media content rendered in the graphical user interface.

To carry out the selecting, the one or more hardware processors are further configured to perform operations including (i) determining paused instances of the media player program that are loaded in background, and selecting the determined instances. Then, (ii) determining un-paused instances of the media player program running in the background, and selecting the determined instances. Then, (iii) determining priority instances of the media player program running in the background, and selecting the determined instances. Then, (iv) determining a focus instance of the media player program running in the background, and selecting the determined instance. Then, (v) determining helper instances of the media player program running in the background, and selecting the determined instances. Then, (vi) determining paused instances of the media player program that are loaded in foreground, and selecting the determined instances. Then, (vii) determining un-paused instances of the media player program running in the foreground, and selecting the determined instances. Then, (viii) determining priority instances of the media player program running in the foreground, and selecting the determined instances. Then, (ix) determining a focus instance of the media player program running in the foreground, and selecting the determined instance. Then, (x) determining helper instances of the media player program running in the foreground, and selecting the determined instances. The one or more hardware processors are further configured to perform operations including carrying out the sequentially shutting down one instance at a time in order of instance selection.

To carry out the shutting down, the one or more hardware processors are further configured to perform operations including displaying corresponding proxy icons in place of at least a portion of the shutdown instances.

According to another aspect, the described subject matter can also be implemented in a computer storage medium encoded with a computer program, the program including instructions that when executed by data processing apparatus cause the data processing apparatus to perform operations including monitoring consumption of computing resources of multiple running instances of a media player program to render respective media content in a graphical user interface of a mobile device. The graphical user interface associated with an additional program configured to render additional content, different from the media content, to the graphical user interface. The operations also include instructing a first group of instances from among the multiple running instances to reduce respective portions of the computing resources consumption in response to determining that a requested increase in computing resources consumption of the media player program would cause the computer resources consumption of the media player program to exceed a first predetermined level, and flagging other instances from among the multiple running instances to subsequently reduce corresponding computer resources consumption. The operations also include allocating the requested increase in computer resources consumption in response to determining that the computer resources consumption would be less than the first predetermined level after accounting for the instructed reduction of the first group of instances. Further, the operations include selecting one or more instances to be shut down among the multiple instances in response to determining that a new computer resources consumption, after accounting for the instructed reductions of the first group of instances and of the flagged instances and for the allocation, is greater that a second predetermined level. The operations further include shutting down at least a portion of the selected instances to bring the computing resources consumption below the second predetermined level.

Particular embodiments of the subject matter described in this specification can be implemented so as to realize one or more of the following advantages. Closing media player instances that are running in a browser program may be carried out according to computing resources available to a particular mobile device executing the browser program. The foregoing, allows a user to interact with the browser program without having to be mindful of the resource requirements necessary to do so. This can provide the user with a substantially similar user experience regardless of the type of mobile device used to execute the browser program hosting the multiple running instances of the media player. Similar advantages may also be realized within the context of another execution environment, different than a browser program.

Additionally, the techniques described in this specification can make more efficient use of limited computing resources available on a mobile device, enabling allocation of computing resources to other tasks performed by the mobile device. Further, the disclosed techniques can be used to close down single instances without closing all running instances of the media player program. Furthermore, a browser program (or other execution environment) running on a mobile device may become more responsive and more stable and may avoid crashing, because the instance shutdowns can be performed cleanly. In addition, having the media player program, rather than the browser or other execution environment, decide when to shut down one or more multiple running instances may be potentially advantageous because the media player program can determine a relative priority of content played by the multiple instances running instances, and can take measures to avoid shutting down particular instances as necessary.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A and 4B show aspects of the method for managing computing resources consumed by the multiple running instances of a media player program.

FIGS. 6A and 6B show an example of a method for selecting instances to be shut down from among the running instances of a media player program.

Like reference numbers and designations in the various drawings indicate like elements.

DETAILED DESCRIPTION

Figure 1:
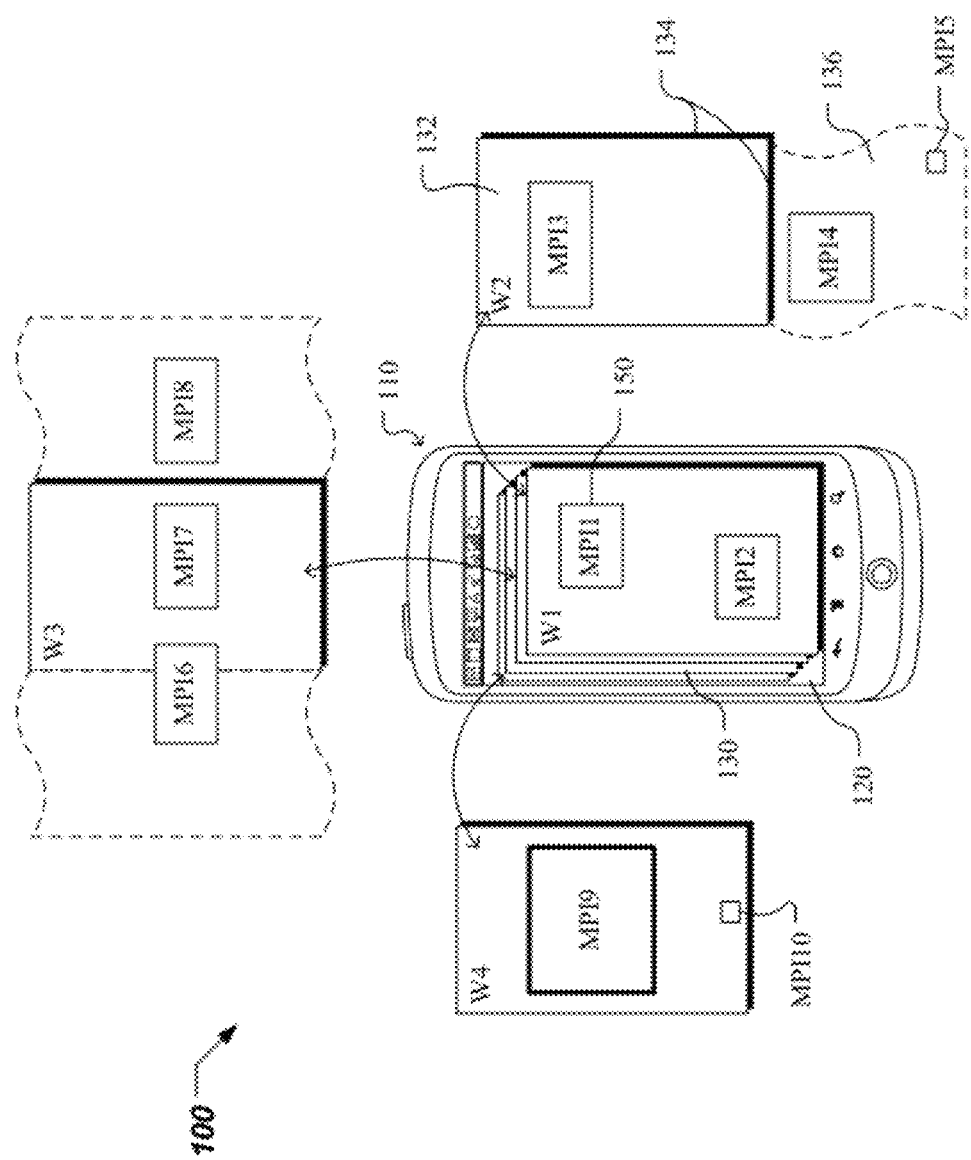
FIG. 1 shows diagrams of an example of a system for running multiple instances of a media player program.

As shown in FIG. 1, an example of a system 100 for running multiple instances of a media player program includes a mobile device 110. Mobile device 110 can include a touchscreen device 120, which can be configured as a graphical user interface (GUI) for multiple programs running on mobile device 110. System 100 further includes a program 130 and a media player program 150. The media player program 150 can be included in or otherwise can be accessible to program 130.

Program 130 can represent a web browser program or another program that provides an execution environment (e.g., a cross-platform runtime environment). Program 130 is configured to render webpage content and can include multiple instances W1-W4. In some implementations, the multiple instances W1-W4 of the browser program can represent browser windows, browser tabs, cards, and the like. Instances W1-W4 of the browser program can render respective webpages. In addition, each instance of the browser program, e.g. W2, can display a portion 132 of a webpage, while a non-displayed portion 136 of the webpage remains hidden from view. A scrollbar 134 or other GUI mechanism can allow users associated with device 110 to interactively select which portion of the webpage to display in the browser instance, by moving scrollbar 134 up or down (e.g. in W2), and left or right (e.g. in W3). Additionally, a user can select a browser instance from among the multiple browser instances W1-W4 by tapping on an associated browser tab. Further, a user can remove a browser instance from the foreground of the browser program (and can push the removed browser instance into the background of browser program) by swiping on the foreground browser instance.

Media player program 150 can render media content associated with a webpage. The media content includes one or more types such as, for example, video, audio, media animation, still images, text, interactive content forms, and the like. Further, multiple instances of media player 150 can run within corresponding browser instances W1-W4. In the example system 100 illustrated in FIG. 1, browser instance W1 includes media player instances MPI1 and MPI2; browser instance W2 includes media player instances MPI3, MPI4 and MPI5; browser instance W3 includes media player instances MPI6, MPI7 and MPI8; and browser instance W4 includes media player instances MPI9 and MPI10.

A running instance of media player program 150 consumes computing resources available to mobile device 110. Additionally, ones among the running media player instances that may be playing media content consume more computing resources than other ones among the running media player instances that can be paused. In the example system 100 illustrated in FIG. 1, media player instances MPI1, MPI3, MPI5, MPI6, MPI7, MPI9 and MPI10 are playing content, while media player instances MPI2, MPI4 and MPI8 are paused, at the current time.

The computing resources consumed by device 110 for running multiple instances MPI1-MPI10 can include memory, power and cycles of one or more processors power or processor cycles, network bandwidth, battery life, multiple CPUs and graphics coprocessors and the like. Memory, processor power and battery life tend to be limited resources on mobile devices 110. In many cases, there is no practical way to determine how much memory or processor power a given instance of a media player program may require prior to running the given instance. This means that there may be no way to know if the given media player instance can run on mobile device 110 before actually starting and running the given instance.

Figure 2:
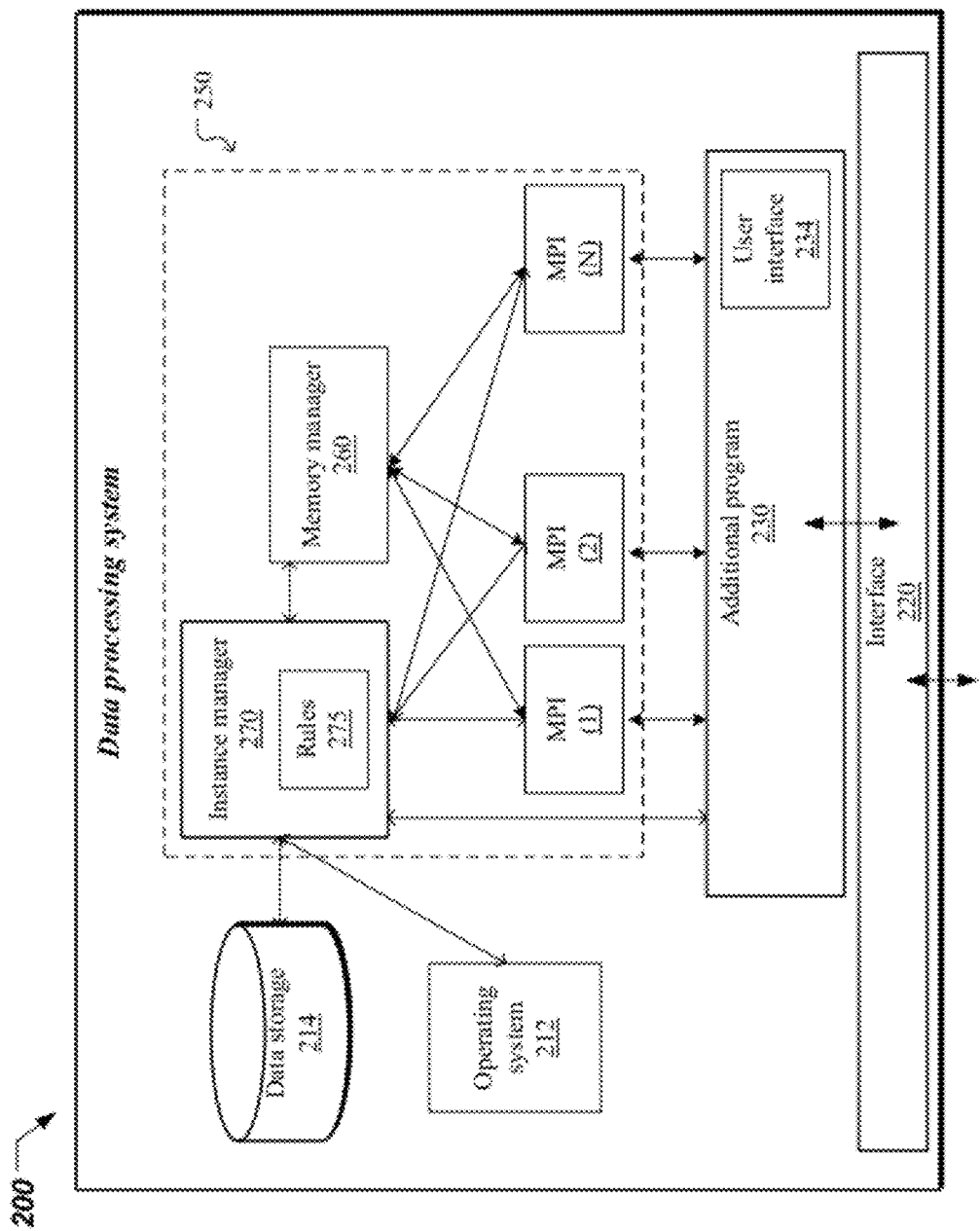
FIG. 2 shows a schematic diagram of an example of a system for managing multiple instances of a media player program.

FIG. 2 shows a schematic diagram of an example of a data processing system 200 for managing multiple instances MPI (1), . . . , MPI(N) of a media player program 250. Data processing system 200 can represent another implementation of system 100. For example, media player program 250 and its instances MPI(1), . . . , MPI(N) can correspond to media player program 150 and its instances MPI1, . . . , MPI10. Furthermore, an additional program 230 and its user interface 234 can respectively correspond to program 130 and its user interface 132-136. Also, interface 220 of data processing system 200 can correspond to touchscreen device 120 of mobile device 110. Media player program 250 can use an instance manager 270 to determine if there is sufficient memory or processor power for running instances MPI(1), ..., MPI(N) of the media player program 250. Instance manager 270 is configured to perform the foregoing determination by parsing information gathered from running instances MPI(1), ..., MPI(N), from a memory manager 260 of media player 250, and from an operating system 212 associated with system 200, as described in detail below. Note that, although shown as part of media player program 250, one or both of memory manager 260 and instance manager 270 can be separate programs from media player program 205.

If the determination indicates that there are insufficient computing resources for running instances MPI(1), ..., MPI(N), the instance manager 270 can take action to release computing resources from the given instance and other instances, which are running at the time of the determination, so that, for example, the given instance can keep running. Alternatively, when no additional computing resources can be accessed, instance manager 270 can shut down the given instance and the other running instances of the media player. By performing these actions, instance manager 270 can potentially enable media player program 250 to access computing resources of data processing system 200 in a controlled manner and, for example, to gradually shut down instances of media player program 250 when the computing resources consumption is too high.

In operation, a media player program 250 can manage its instances, MPI(1), ..., MPI(N), to keep memory consumption as low as possible while also not over taxing a processor of system 200. Memory manager 260 of the media player program is configured to control memory consumption in a proactive and continual manner, not only in reaction to low memory situations. Because memory manager 260 tunes the media player's memory consumption to allow running instances MPI(1), ..., MPI(N) to perform optimally, using as little memory as necessary, then when media player program 250 runs out of memory, instance manager 260 can turn to shutting down a subset of player instances MPI(1), ..., MPI(N) to release some of the memory back to media player program 250. Working together, memory manager 260 and instance manager 270 avoid situations when media player program 250 functions at ever lower performance levels until a player performance becomes unacceptably slow. When there is more than one active player instance and there are indications of high computing resources consumption, instance manager 270 can select a player instance to shut down while leaving the others running. The selection can be performed based on rules 275 for selecting which player instances to shut down. For example, the instance that is selected by instance manager 270 for shutdown may not necessarily be the one that runs out of memory. Multiple rules 270 are described in detail below. Further, rules 275 can be stored in a data storage device 214 of data processing system 200.

Memory manager 260 can allocate memory for all player instances MPI(1), ..., MPI(N) from a shared pool of memory. The memory used by one active player instance is not available for another active player instance, and memory released by one active player instance can be available for another active player instance. If system 200 reaches a state where the memory manager 260 cannot allocate more memory, all player instances MPI(1), ..., MPI(N) may fail unless action is taken to provide memory resources. In some cases, none of the player instances MPI(1), ..., MPI(N) can continue to receive memory until the available memory pool is restored. For example, the memory manager 260 can provide a callback to instance manager 270 to request more memory. If this callback can return enough memory to the memory manager 260 to satisfy the current request, then the player instances MPI(1), ..., MPI(N) can continue to operate normally, for a while. But it is quite likely that another out of memory (OOM) situation may soon follow.

Instance manager 270 is configured to shut down one player instance, rather than all of them, as a first response. Additionally, instance manager 270 is configured to perform the shutting down as cleanly (normally) as possible. However in some situations, instance manager 270 can shut down all player instances MPI(1), ..., MPI(N) at once to avoid crashing the additional program 230, which hosts the running player instances MPI(1), ..., MPI(N). In the case when all player instances MPI(1), ..., MPI(N) are simultaneously closed, instance manager 270 bypasses normal shutdown of the player instances. However, such aborting of player instances MPI(1), ..., MPI(N) may not be a clean shutdown process, because such aborting bypasses running class destructors, and the like. Instance manager 270 is configured to sequentially shut down single instances cleanly, only when necessary, and is designed to avoid the abort scenario. Since instance manager 270 cannot determine a priori whether media player program 250 can recover enough memory to shut down cleanly, instance manager 270 can use the described emergency shutdown procedure as a backup.

Figure 3:
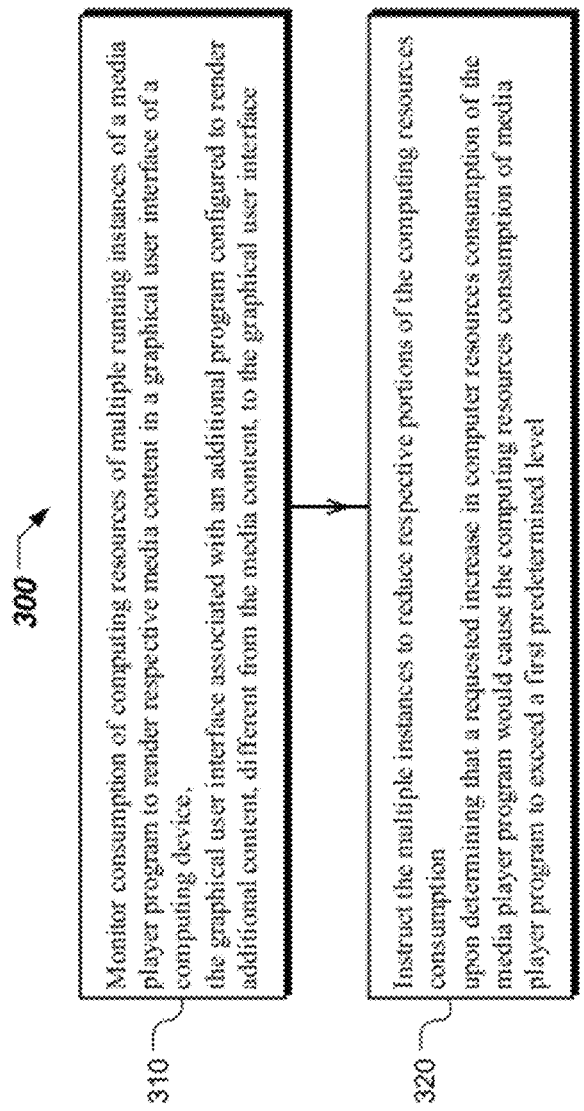
FIG. 3 shows an example of a method for managing computing resources consumed by multiple running instances of a media player program.

FIG. 3 shows an example of a method 300 for managing computing resources consumed by multiple running instances of a media player program. Method 300 can be implemented, for example, by data processing system 200. Method 300 includes monitoring 310, by instance manager 270, consumption of computing resources of multiple running instances of a media player program 250. The instances of media player program 250 render respective media content in a graphical user interface 234 of system 200. Graphical user interface 234 can be associated with an additional program 230 configured to render additional content to graphical user interface 234. The additional content rendered by additional program 230 is different from the media content rendered by media player program 250. Additional program 230 can be a browser program, and the additional content can represent webpage content.

Method 300 continues with instance manager 270 instructing 320 the multiple instances to reduce respective portions of the computing resources consumption upon determining that a requested increase in computer resources consumption of the media player program 250 would cause the computer resources consumption of the media player program 250 to exceed a first predetermined level. Media player program 250 can be in a normal state of consumption when consuming computing resources below the first predetermined level, and can be in a marginal state of consumption when consuming computer resources above the first predetermined level. The instructed reduction is intended to cumulatively release enough computing resources from all of the running instances to cause a transition from the marginal state to the normal state of consumption. In some implementations, when the computing resources represent memory, the first predetermined level corresponds to a soft limit of memory consumption as described in detail below.

In particular situations, memory manager 260 can request that a given amount of memory be allocated by operating system 212 to media player program 250, and such request cannot be honored by operating system 212. In these particular situations, instead of aborting the running player instances of media player 250, instance manager 270 can instruct the running player instances to reduce respective portions of memory consumption. The memory released in this manner can be allocated by memory manager 260 to honor the foregoing request of media player program 250. As detailed below in connection with FIGS. 5A and 5B, the running player instances can perform the instructed reduction synchronously (i.e. when receiving the instruction,) or asynchronously (i.e. at a later time,) depending on respective execution states of the running instances.

FIG. 4A shows another example of a method 400 for managing computing resources consumed by the multiple running instances of a media player program. Data processing system 200 can combine method 400 with method 300. For example, method 400 can be executed prior to instructing 320 the multiple instances to reduce respective portions of the computing resources consumption. Method 400 includes identifying 412 instances from among the multiple running instances for immediate reduction of the respective portions of the computing resources. For example, some of the running instances may be at stages of execution when they can reduce respective computing resources consumption (e.g., clear caches, collect garbage, and the like) upon receiving such instruction. Inactive instances, such as e.g. paused instances, can be identified in this manner to release memory back to operating system 215, immediately after being so instructed.

Method 400 further includes flagging 414 instances from among the multiple running instances for subsequent reduction of the respective portions of the computing resources. For example, some of the running instances may be at stages of execution when they cannot reduce respective computing resources consumption (e.g., clear caches, collect garbage, and the like) upon receiving such instruction. Active instances, such as e.g. instances currently playing media content, can be flagged in this manner to release memory back to operating system 215, at a later time after being so instructed, for example, after completing currently running tasks. The identifying 412 and flagging 414 aspects of method 400 are described in detail with respect to FIGS. 5A and 5B.

FIG. 4B shows another example of a method 450 for managing computing resources consumed by the multiple running instances of a media player program. Data processing system 200 can combine method 450 with methods 300 and 400. For example, method 450 can be executed after instructing 320 the multiple instances to reduce respective portions of the computing resources consumption. Method 450 includes determining 460 that a new computer resources consumption of the media player program 250 is above the first predetermined level after accounting for the instructed reductions and for the requested increase. For example, instance manager 270 and memory manager 260 can assess an effect of the instructed reductions carried out synchronously, by a number of identified instances, and asynchronously, by another number of flagged instances. A result of determining 270 can be that the current computer resources consumption is still above the first predetermined level. In case the first predetermined level represents a soft level of memory consumption, method 450 can continue with instance manager 270 selecting 470 one or more instances to be shut down among the multiple instances. The selecting 470 aspect of method 450 is discussed in detail below in connection with FIGS. 6A and 6B. However prior to selecting 470, instance manager 270 can also determine 465 that the new (current) computer resources consumption of the media player program 250 is above the first predetermined level and is also below a second predetermined level after accounting for the instructed reductions and for the requested increase. The second predetermined level can correspond to a hard level of memory consumption, when operating system 215 cannot allocate memory requested by media player system 250. Thus, by determining 465 that the new computer resources consumption of the media player program 250 is below the hard level, instance manager 270 can safely performing the subsequent aspects of method 450.

Method 450 further includes shutting down 480 the selected instances to bring the computing resources consumption below the first predetermined level. For example, instance manager 270 can sequentially shut down 485 one instance at a time from the selected instances until the computing resources consumption is decreased from above the first predetermined level to below the first predetermined level. For example, instance manager 270 can shut down a first selected instance of the media player program, and then can detect whether the media player program 250 has transitioned from the marginal state, where consumption of computing resources is above the first predetermined level, to the normal state where the consumption of computing resources is below the predetermined level. If no such transition can be detected, then instance manager 270 shuts down 485 a second selected instance of the media player program. Instance manager continues to toggle between determining whether the transition from marginal state to normal state has occurred and shutting down 485 one instance at time from among the instances selected for closing, until the transition from the marginal state to the normal state of computing resources consumption is detected.

As described above, systems 100 and 200, and methods 300, 400 and 450 can be used to handle out of memory (OOM) conditions. The systems and methods disclosed in this specification can also be used to trigger instance shutdown based on logic to maintain a minimum frame rate for one or more media player instances. The logic for instance shutdown selection may be similar to the selection rules discussed below. Additionally, the methods disclosed in this specification can be used to pause an instance instead of shutting it down when computing resources become less readily available. In some implementations, selected instances can be suspended to reduce their respective memory consumption without shutting them down. In general, the disclosed methods and systems can be used to iterate through and select instances based on priority to improve performance of the media player program as needed.

The first predetermined level of computing resources consumption described above in reference to aspect 320 of method 300 can be implemented as a soft limit. The soft limit can differ from device to device and so a variable corresponding to the soft limit can have a compile time default that can be modified for each device build. In some implementations, the soft limit can be a constant for each device type. For builds corresponding to desktop devices, the soft limit can default to unlimited (like heapHardLimit,) but can be overridden in configuration files (e.g., in oem.cfg) for testing purposes. For example, a configuration file can include a tag called heapSoftLimit to allow setting the soft limit size in megabytes like the heapHardLimit.

In some implementations, memory manager 260 can trigger a kFreeMemoryIfPossible OOM callback when the memory consumption grows larger than the current soft limit. When the memory consumption increases over the soft limit, memory manager 260 is configured to not trigger logic for memory abort. An actual failure to allocate, due to a system allocation failure, or heapLimit, causes memory manager 260 to trigger kFreeMemoryIfPossible followed by kMemAbort. The soft limit trigger can additionally be used, by instance manager 270, as a signal to trigger the instance management logic. If the media player program 250 is in a marginal state of memory consumption, e.g. called kMemSoftLimit, when memory is freed, and if the freeing of memory causes the memory consumption to drop below the soft limit, the media player program 250 may return to a normal state of memory consumption, e.g. called kMemNormal.

Additionally, memory manager 260 is further configured to register for OOM callbacks and to force garbage collection on each player instance's memory consumption in response to a kFreeMemoryIfPossible OOM callback and a transition to the marginal state kMemSoftLimit. Since a large number of memory allocations may occur while in the marginal state kMemSoftLimit, memory manager 260 is configured to collect on state transitions and not on every allocation/access in that state to avoid thrashing.

The OOM callback for kFreeMemoryIfPossible may or may not release any memory within the synchronous callback. The purpose of this OOM callback is to trigger logic that can asynchronously release memory. While possible, it is not required for the player instances to release memory synchronously upon a kFreeMemoryIfPossible callback. For example, player instances that are not currently running can be called synchronously to free memory. The soft limit can trigger before the system runs out of memory, so in most cases there may be extra memory to complete the current operations on the stack. Shortly afterwards, the asynchronous scheduled actions may cause extra memory to be released and memory usage can again fall below the soft limit.

Note that the kFreeMemoryIfPossible callback can also be triggered when the media player program 250 hits another predetermined level higher than the soft limit. The second predetermined level of computing resources consumption described above in reference to aspect 465 of method 450 may be implemented as a hard limit. In that case, when the memory consumption were to increase above the hard limit, and if enough memory to satisfy the kFreeMemoryIfPossible request cannot be acquired, the kMemAbort logic can be triggered to shut down all player instances.

Instance manager 270 is configured to provide an OOM callback to release platform resources when an out of memory situation occurs. Instance manager 260 can implement instance shutdown logic that includes registering an OOMCallback to the GCHeap logic implemented by memory manager 260. To implement such logic, instance manager 270 can add an OOMCallback through logic executed by memory manager (GCHeap( )→AddOOMCallback(OOMCallback*)). The registration of the instance manager's callback is performed early, while global variables of core player 250 are first initialized. For example, an OOMCallback can handle a transition from kMemNormal to kMemSoftLimit. This callback may be responsible for releasing resources of running player instances.

When there are multiple running player instances, instance manager 270 can select an instance to shut down. The selection process can include calculating a priority value for each instance. The player instance having the lowest priority value can be selected for shut down. A priority value for a given instance of the media player program can be calculated based on multiple characteristics of the given instance.

For example, a priority value can be assigned to the given instance in response to determining whether the given instance is running in the foreground or in the background. In example system 100, media player instances MPI1 and MPI2 are loaded in foreground instance W1 of program 130. Further, player instances in a frame on a foreground tab of a browser can be given higher priority than any instance in a background tab. If the foreground browser tab has player instances in multiple frames, only one of the frames can be considered to be in the foreground, and the others instances running in other frames of the foreground tab can be treated as if they were in a background tab.

Further, a priority value can be assigned to the given instance in response to determining whether the given instance is a helper instance of the media player program. A helper instance can be a hidden and/or a tiny (e.g., 1-2 pixels) media player instance that can be configured to control other media player instances running in a browser and HTML elements of a webpage presented by the browser. In example system 100, media player instances MPI5 and MPI10 are helper instances running in respective instances W2 and W4 of program 130. The helper instances are the last ones to shutdown. When instance manager 270 can select a helper instance for shutdown, instance manager 270 also switches all the other player instances on this webpage to OOM state because the other instances may not be reliably restarted when the helper media player instance is not running.

Furthermore, a priority value can be established for the given instance in response to determining a previously assigned priority to the given instance. For example, html flags corresponding to the given instance can specify whether media content rendered by the given instance on a webpage has priority over other media content rendered by other instances running on the webpage. The previously assigned priority can be set with a "hasPriority" flag. Such flag can be set for each active instance as it is started so that the flags can be used to determine which instances can be kept in memory if possible. In example system 100, media player instances MPI7, MPI8 and MPI6 running in instance W3 of program 130 have pre-assigned priority 1, 2 and 3 respectively.

Additionally, a priority value can be assigned for the given instance in response to determining that the given instance is in focus. Instance manager 270 can place top priority on keeping content that a user has most recently interacted with. Throughout this specification, the foregoing property is called "focus". It is possible that no running instance is in focus, for example, when a webpage loads and the user has not interacted with any of the running instances, yet. In example system 100, media player instance MPI9 running in background instance W4 of program 130 has focus, as being the last instance that a user associated with mobile device 110 has interacted with. Further, focus can be recorded as a mouse/pen/finger touch within the content area of the media player instance. Such touch can mark that instance as having the user focus.

Also, a priority value can be assigned for the given instance in response to determining whether the given instance is paused. Instances can be paused due to going off-screen (either in background browser tabs, or in on off-screen area 136 of a webpage.) Off-screen instances may not be paused if they have high pre-assigned priority or if they contain active audio/video content. In example system 100, media player instances MPI2, MPI4 and MPI8 loaded in respective instances W1, W2 and W3 of program 130 are paused.

In addition, a priority value can be assigned for the given instance in response to determining whether the given instance is at least partially visible to a user of the mobile device at the current time. In example system 100, media player instances MPI1 and MPI2 loaded in foreground instance W1 of program 130 are visible.

In accordance with the instance characteristics described above, instances of a media player program running in a web browser program can be prioritized as follows:

(1) Keep the helper instance if it exists in the foreground.
(2) Keep the focus instance if it exists in the foreground.

(3) Keep all priority instances in the foreground.

(4) Keep any un-paused user visible instances in the foreground.

(5) Keep any paused instances in the foreground.

(6) Keep the helper instance if it exists in the background.

(7) Keep the focus instance if it exists in the background (8) Keep all priority instances in the background (9) Keep any un-paused instances in the background

(10) Keep any paused instances in the background

If there are multiple background tabs W2-W4, they may not be prioritized as groups. For example all paused instances in all background tabs W2-W4 can be shut down before shutting down a priority instance in the background tabs. If the remaining choices are equal, instance manager 270 is configured to simply release the next instance in sequence (as loaded from the website). If the instance to be shutdown is a helper instance (FC5 or FC10), then all the player instances on the webpage (W2 or W4, respectively), are being switched to OOM state.

Releasing a player instance can happen asynchronously to the OOM callback. For example, the callback may call player→SetPlayerUnloadStatus( ). Specialized code within the platform timer logic can detect this state before calling the doPlay loop of that player instance. At that point, the player instance can be unloaded, while the instance manager 270 may present a click-to-play icon to allow restarting of the shutdown instance.

Shutting down a player instance may release enough memory to drop memory usage lower than the soft limit. In addition to shutting down a single instance, all player instances can free extra resources if possible on hitting the memory soft limit. To ensure this can be done safely, each player instance can be flagged by instance manager 270 to cleanup resources on the next doPlay entry, for example. In this example, code of instance manager 270 (e.g., GCHeap code) may automatically check on each player instance for a transition back to kMemNormal status. Once this happens, crossing the soft limit again may repeat the same sequence of events. In some implementations, only one OOMCallback may be generated for each transition.

Figure 5A:
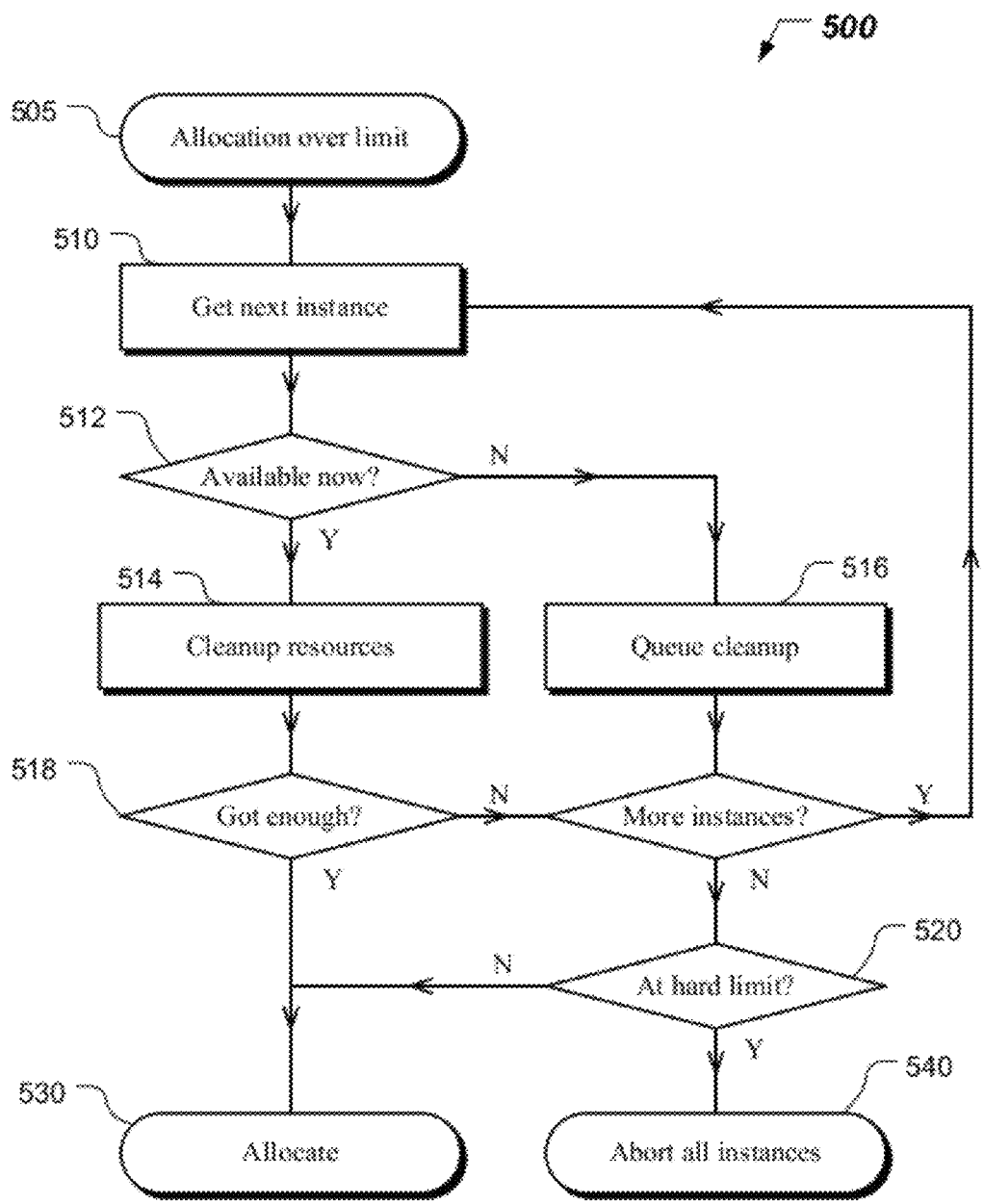
FIGS. 5A and 5B show other examples of methods for managing computing resources consumed by multiple running instances of a media player program.
Figure 5B:
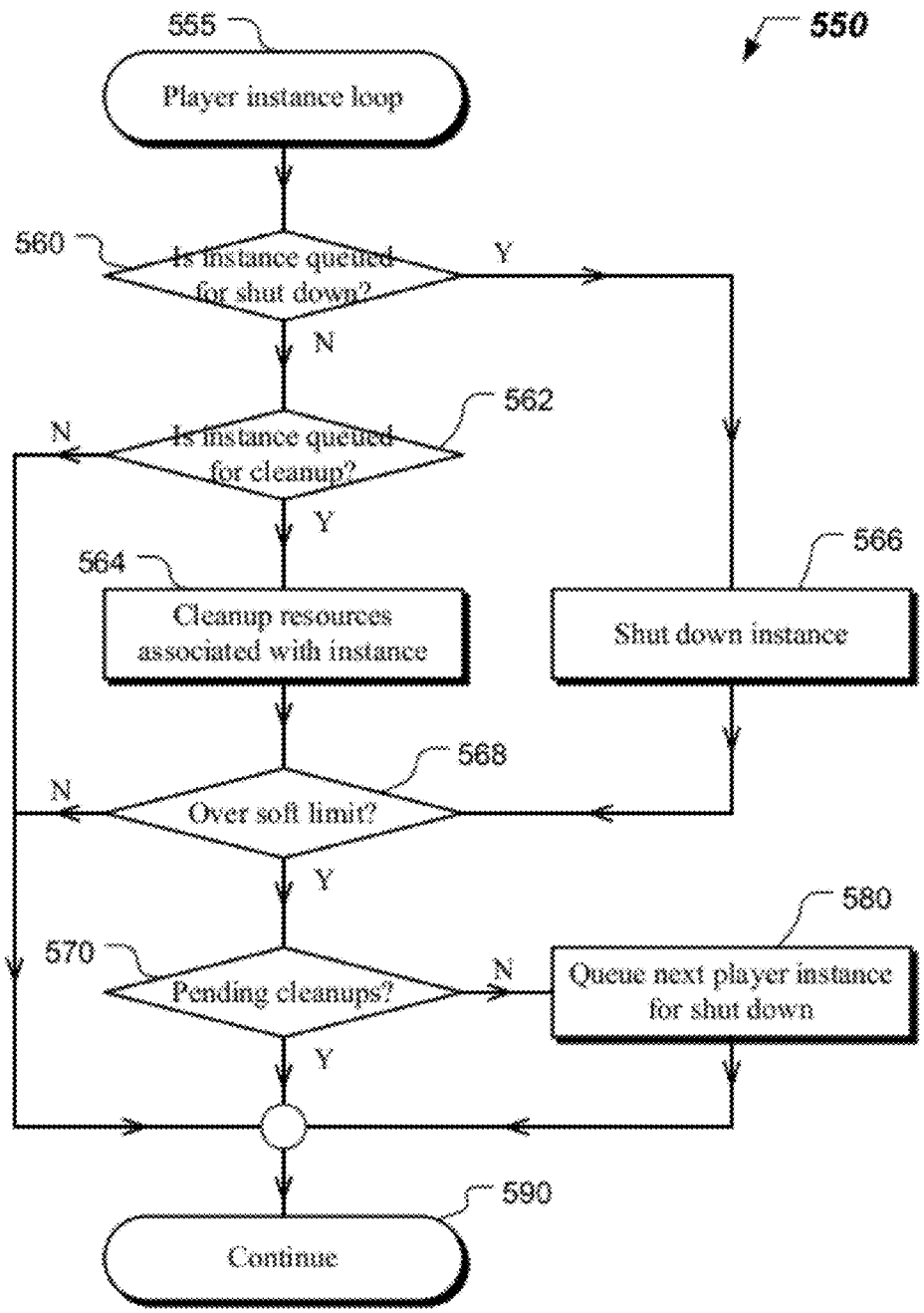

FIGS. 5A and 5B show examples of methods 500 and 550 for managing computing resources consumed by multiple running instances of a media player program. Methods 500 and 550 can be implemented, for example, in systems 100 or 200.

Referring to FIG. 5A, method 500 includes determining 505, by an instance manager, that the operating system cannot satisfy a previous request for allocating computing resources. For example, in case one of multiple running instances of the media player program requests a chunk of memory that would cause a memory consumption of the media player program to exceed a predetermined hard level, then the operating system would deny such a request.

Method 500 continues with the instance manager iterating 510 through the multiple running instances of the media player program for instructing the multiple running player instances to cleanup respective computing resources. By doing so, the multiple running player instances may collectively return back to the operating system at least a portion of the currently used computing resources. In this manner, the operating system may regain the at least a portion of computing resources released by the running player instances to honor the previously denied allocation request from the media player program.

Method 510 includes checking 512, by the instance manager, whether a given player instance is currently available for performing a cleanup process. For example, the given player instance can be unavailable to cleanup respective computing resources because it may need to complete previously scheduled tasks. In another example, a player instance can be unavailable to cleanup respective computing resources because it is actively playing media content. Method 500 includes flagging 516 of the unavailable player instances for cleaning at a later time. As part of flagging 516, the instance manager can queue currently unavailable player instances for asynchronous processing, i.e., for cleaning at a subsequent time. Upon queuing 516 the given player instance for subsequent cleanup, the instance manager can return to polling 510 a next player instance of the media player program. Moreover, method 500 can exit the polling loop upon polling 510 all running instances of the media player program.

However, as a result of checking 512, the instance manager can determine that the given player instance is available to cleanup respective computing resources upon receiving an instruction to do so. For example, the given player instance may be available to immediately cleanup respective computing resources because it may have completed previously scheduled tasks. In another example, a player instance may be available to cleanup respective computing resources because it is currently inactive (e.g., paused, placed in a low memory state, stopped, and the like.) The available player instances can be instructed 514 to cleanup respective computing resources synchronously, i.e., upon receipt of the instructions. Examples of resource cleaning 514 performed by the given player instance are cleaning memory caches and collecting garbage.

The instance manager can continue performing method 500 by determining 518 whether the computing resources released back to the operating system due to the cleaning 514 performed by the given player instance would cause the operating system to honor the previously denied allocation request. When a result of determination 518 is negative, then the instance manager can return to polling 510 a next instance of the media player program. Further, upon polling 510 all running instances of the media player program, method 500 can exit the polling loop. Furthermore, when the result of determination 518 is positive, the instance manager can exit the polling loop without having to iterate through all running player instances. Upon exiting the polling loop in this later manner, method 500 can continue with the media player program receiving 530 from the operating system the requested computing resources allocation.

When method 500 exits the polling loop after polling 510 all running instances of the media player program, the instance manager can verify 520 whether a consumption of computing resources would exceed the predetermined hard level after accounting for the iterative synchronous cleanups 514 and for the requested allocation. When a result of the verification 520 is positive, the operating system would continue to deny the requested allocation. In this situation, method 500 includes aborting 540 by the media player program, of all running player instances to free computing resources used by the media player program. When a result of the verification is negative, method 500 can continue with the media player program receiving 530 from the operating system the requested computing resources allocation.

Referring to FIG. 5B, method 550 can be implemented by an instance manager after completing method 500. Further, method 550 can be implemented to release additional computing resources back to the operating system, for example, via cleanups to be executed asynchronously by player instances which have been flagged 516 for cleaning as part of method 500. Moreover, method 550 can be implemented by iterating 555 through each running instance of the media player program.

Once the instance manager picks 555 a given player instance for asynchronous processing, method 550 includes checking 560 whether the given player instance has been selected to be shut down. At least at the beginning of a first iteration 555, no player instances have been selected to be shut down yet. The conditional steps of method 550 that are traversed prior to the instance manager performing a first such selection are described in detail below.

In situations when the instance manager determines 560 that the given player instance has not been selected to be shut down, method 550 continues with the instance manager verifying 562 whether the given player instance has been flagged 516 for cleanup. Method 550 can continue 590 with the media player program performing other type of processing upon verifying 562 that the given player instance has not been flagged 516 for cleanup. However upon verifying 562 that the given player instance has been flagged for cleanup, method 550 includes instructing 564 the given player instance to cleanup computing resources. Examples of resource cleaning 564 performed by the given player instance are cleaning memory caches and collecting garbage.

Method 550 continues with the instance manager determining 568 a current computing resources consumption. Method 550 can continue 590 with the media player program performing other type of processing when the determined computing resources consumption is below a predetermined soft level, i.e., the media player program is in a normal state of computing resources consumption. However, when the determined computing resources consumption is above the predetermined soft level, i.e., the media player program is in a marginal state of computing resources consumption, method 550 continues with the instance manager checking 570 whether any other player instances has been flagged 516 for cleanup. Method 550 can continue 590 with the media player program performing other type of processing when the instance manager determines 570 that one or more other player instances are in queue for cleanup.

Moreover when the instance manager determines 570 that no other player instances are in queue for cleanup, method 550 continues with the instance manager selecting 580 a particular player instance from among the multiple running instances of the media player program to be shut down. The selecting 580 can be performed based on the priority list (1)-(10) described above, and in accordance with selection rules described below in connection with FIGS. 6A and 6B. After selecting 580 the particular player instance for shutdown, method 550 can continue 590 with the media player program performing other type of processing.

In other situations, the instance manager can determine 560 that the given player instance has been selected to be shut down. Then, method 550 can continue with the instance manager shutting down 566 the given player instance that has been queued 580 for shutting down. Method 550 further includes determining 568 a computing resources consumption after accounting for shutting down 566 the given player instance. Method 550 can continue 590 with the media player program performing other type of processing when determining 568 that the computing resources consumption is below the predetermined soft level, i.e., the media player program is in the normal state of computing resources consumption. However, when determining 568 that computing resources consumption is above the predetermined soft level, i.e., the media player program is in the marginal state of computing resources consumption, method 550 continues with the instance manager checking 570 whether any other player instances has been flagged for cleanup. As the instance manager determines 570 that no other player instances are in queue for cleanup, method 550 continues with the instance manager selecting 580 another player instance from among the remaining running instances of the media player program to be shut down. Method 550 can then continue 590 with the media player program performing other type of processing.

Figure 6B:
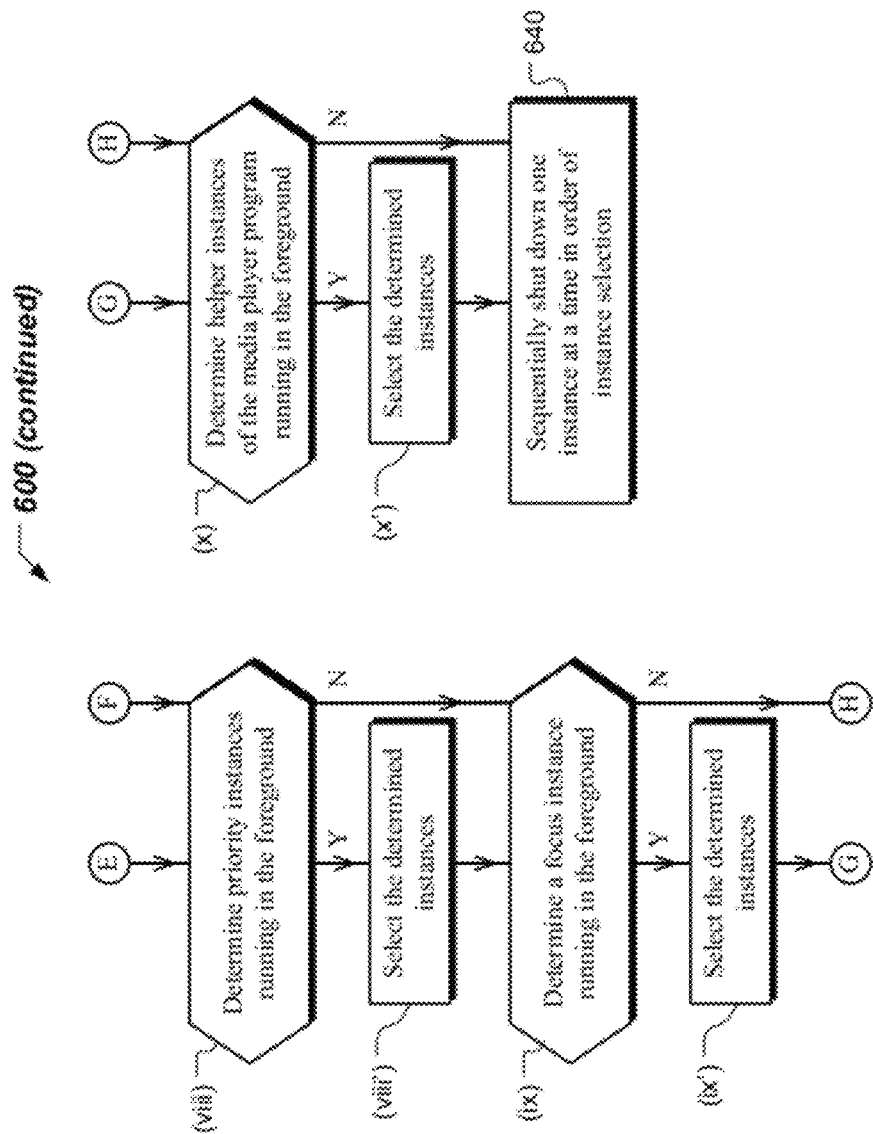

FIGS. 6A and 6B show an example of a method 600 for selecting instances to be shut down from among the running instances of a media player program. Method 600 can be implemented, for example, in systems 100 or 200. Further, method 600 can be combined with method 300 for implementing the selecting 330 of one or more instances to be shut down among the multiple instances in response to determining that the computing resources consumption has remained above a predetermined level. Additionally, method 600 can be combined with method 550 for implementing the selecting 580 of a player instance to shut down among multiple running instances in response to determining that the media player program remains in a marginal state of memory consumption.

The selection of one or more instance to be shut down can be performed by an instance manager associated with the media player program according to one or more rules designed to maximize a number of presentations of the respective media content rendered in the graphical user interface. For example, the selection can be carried out in accordance with the priority list (1)-(10) described above.

Method 600 can include (i) determining paused instances of the media player program loaded in background, and (i') selecting the determined instances. The background includes portions of the graphical user interface that are non-visible. In example system 100, media player instances MPI4 and MPI8 are paused in respective background instances W2 and W3 of program 130, and can be selected based on rule (i)-(i').

Method 600 can continue with the instance manager (ii) determining un-paused instances of the media player program running in the background, and (ii') selecting the determined instances. In example system 100, media player instances MPI3, MPI5, MPI6, MPI7, MPI9 and MPI10 are running in background instances W2, W3 and W4 of program 130, and can be selected based on rule (ii)-(ii').

Method 600 can continue with the instance manager (iii) determining priority instances of the media player program running in the background, and (iii') selecting the determined instances. A priority instance of the media player has a priority pre-assigned by the additional program (e.g., by the program 130.) In example system 100, media player instances MPI6, MPI8 and MPI7 have respective priority 3, 2 and 1 assigned by an instance of program 130 running in background instance W3, and can be selected based on rule (iii)-(iii').

Method 600 can continue with the instance manager (iv) determining a focus instance of the media player program running in the background, and (iv') selecting the determined instance. The focus instance represents an instance of the media player program which has received most recently an instruction via the graphical user interface. In example system 100, media player instance MPI9 running in background instance W4 of program 130 has focus, and can be selected based on rule (iv)-(iv').

Method 600 can continue with the instance manager (v) determining helper instances of the media player program running in the background, and (v') selecting the determined instances. The helper instances are configured to assist running of other instances from the multiple instances. In example system 100, media player instances MPI5 and MPI10 are helper instances running in respective background instances W2 and W4 of program 130, and can be selected based on rule (v)-(v').

Method 600 can continue with the instance manager (vi) determining paused instances of the media player program loaded in foreground, and (vi') selecting the determined instances. The foreground includes portions of the graphical user interface being visible. In example system 100, media player instance MPI2 is paused in foreground instance W1 of program 130, and can be selected based on rule (vi)-(vi').

Method 600 can continue with the instance manager (vii) determining un-paused instances of the media player program running in the foreground, and (vii') selecting the determined instances. In example system 100, media player instance MPI1 is running in foreground instance W1 of program 130, and can be selected based on rule (vi)-(vi').

Method 600 can continue with the instance manager (viii) determining priority instances of the media player program running in the foreground, and (viii') selecting the determined instances. In example system 100, neither of media player instances MPI1 and MPI2 running in foreground instance W1 of program 130 has a pre-assigned priority, so no instance in example system 100 can be selected based on rule (viii)-(viii').

Method 600 can continue with the instance manager (ix) determining a focus instance of the media player program running in the foreground, and (ix') selecting the determined instance. In example system 100, neither of media player instances MPI1 and MPI2 running in foreground instance W1 of program 130 is in focus, so no instance in example system 100 can be selected based on rule (ix)-(ix').

Method 600 can continue with the instance manager (x) determining helper instances of the media player program running in the foreground, and (x') selecting the determined instances. In example system 100, neither of media player instances MPI1 and MPI2 running in foreground instance W1 of program 130 is a helper instance, so no instance in example system 100 can be selected based on rule (x)-(x').

Finally, method 600 continues with the instance manager sequentially shutting down 640 one instance at a time in order of instance selection.

In some implementations of method 600, the instance selection can be performed in accordance with rules (i)-(i'), . . . , and (x)-(x'). In other implementations of method 600, the instance selection can be carried out in accordance with one or more of rules (i)-(i'), . . . , and (x)-(x'). In some other implementations of method 600, the instance selection can be executed in accordance with one of rules (i)-(i'), . . . , or (x)-(x').

Figure 7:
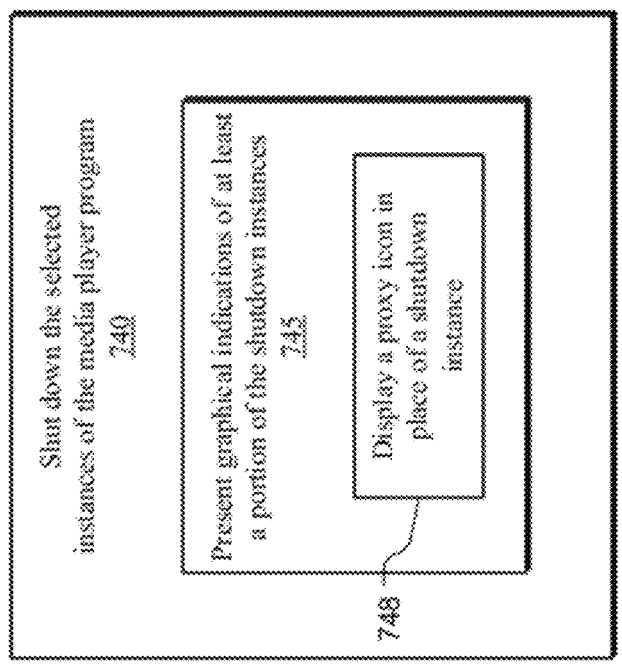
FIG. 7 shows other aspects of the method for managing computing resources consumed by the multiple running instances of a media player program.

FIG. 7 shows other aspects of the method 450 for managing computing resources consumed by the multiple running instances of a media player program. Shutting down 740 of the selected instances of the media player program can be performed by instance manager 270 and can include presenting 745 graphical indications of at least some of the shutdown instances. For example, presenting 745 graphical indications can include displaying 748 a proxy icon in place of a shut-down instance of the media player program. In some implementations, shutting down 740 can include displaying a click-to-play icon of a shut-down instance. In other implementations, aborting 570 can include displaying an out-of-memory icon of an aborted instance.

Figure 8A:
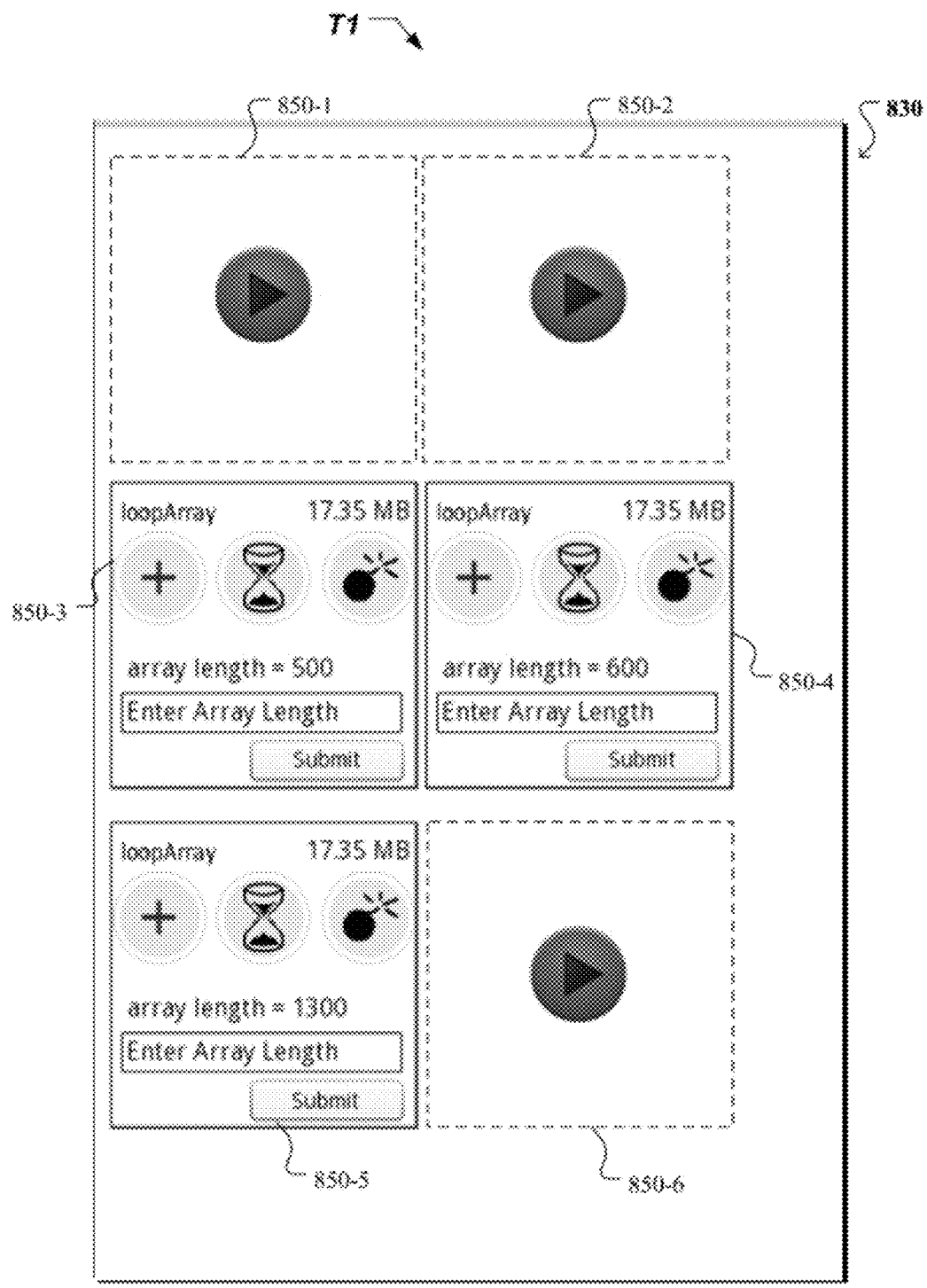
FIGS. 8A-8C show examples of various aspects of implementations of a system and method for managing the computing resources consumed by the multiple running instances of a media player program.
Figure 8B:
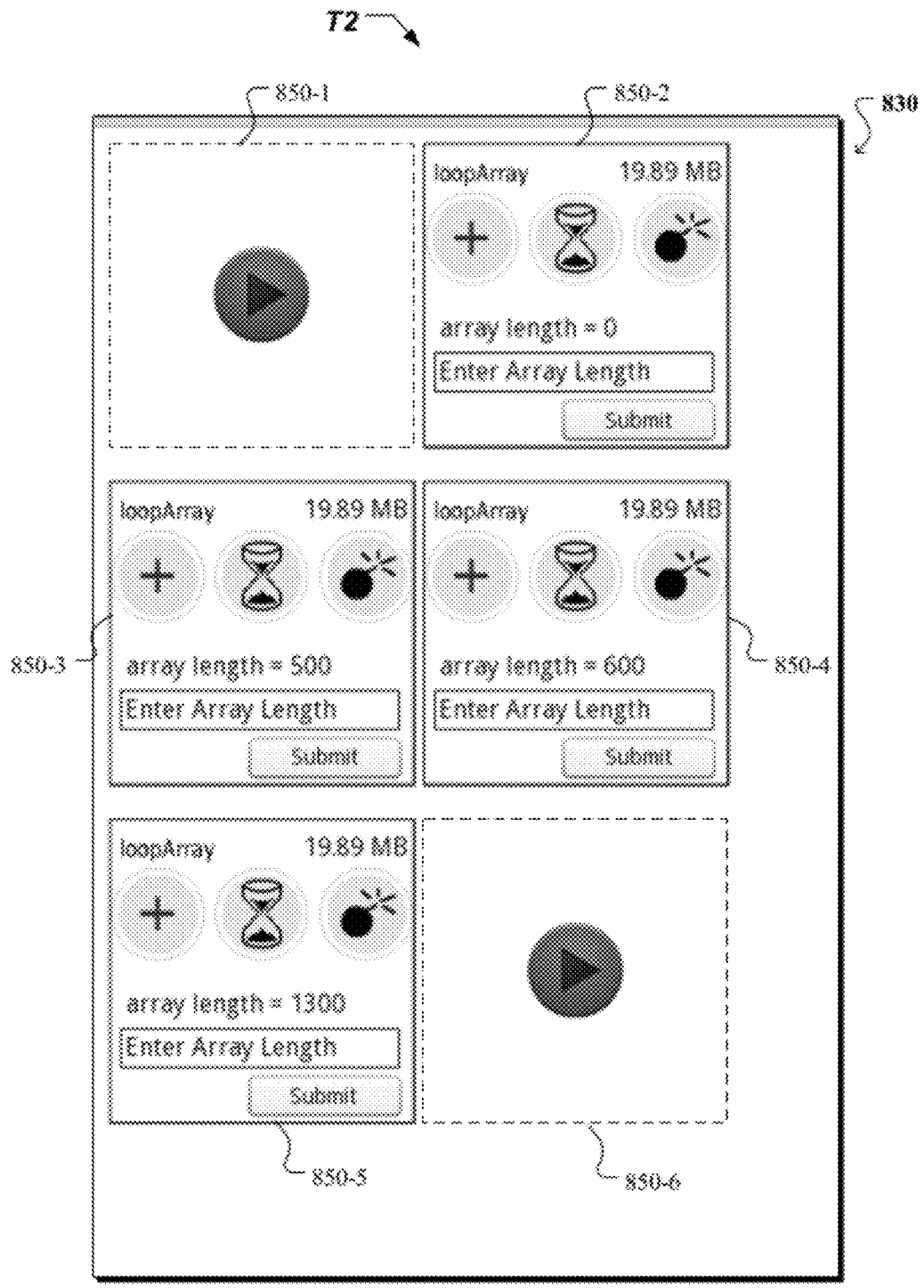
Figure 8C:
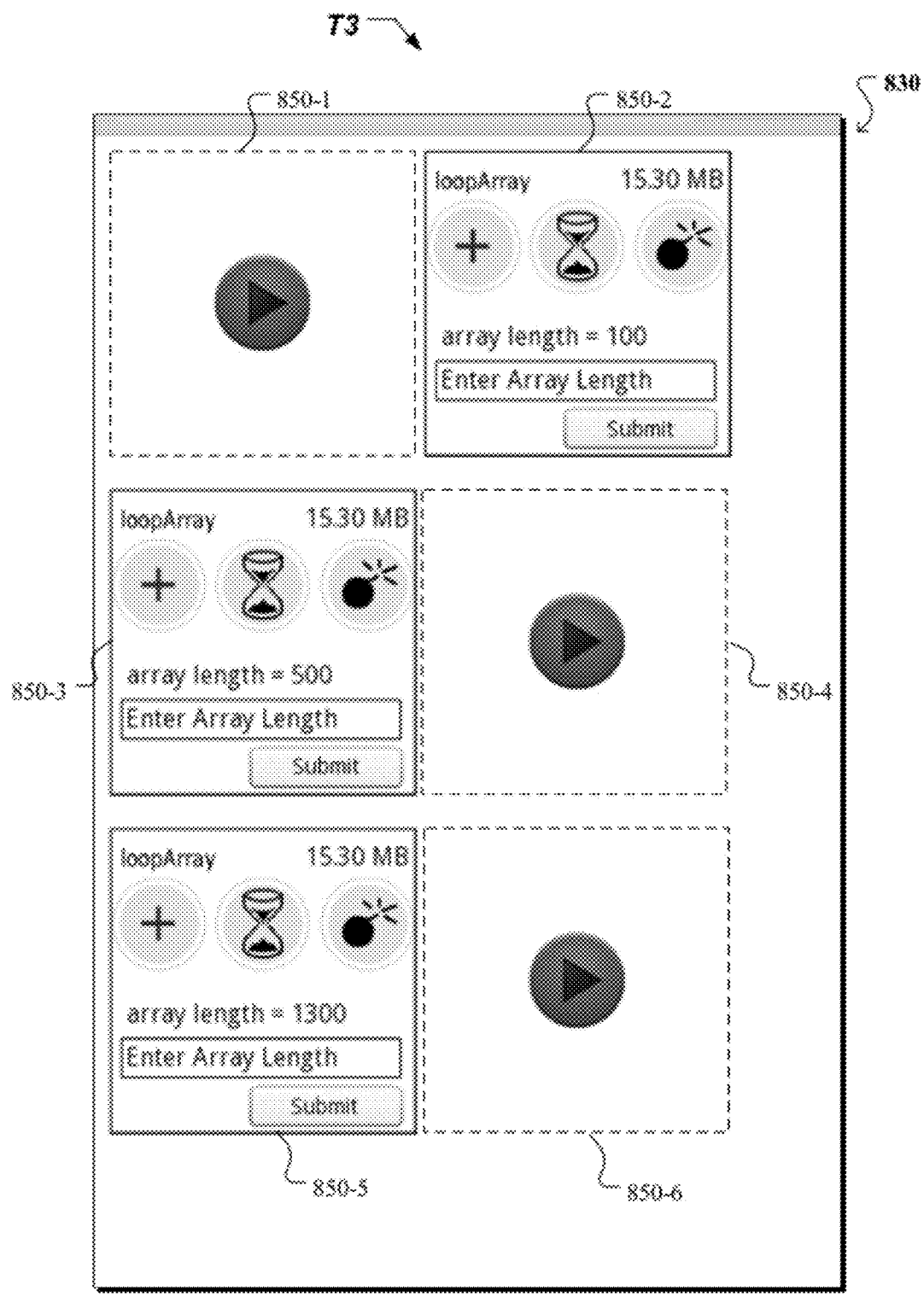

FIGS. 8A-8C show aspects of example implementations of the systems and methods disclosed in this specification. FIG. 8A illustrates six instances 850-1, . . . , 850-6 of a media player program that are loaded in a webpage displayed in browser window 830, at time T1. The underlying media player program has enough memory to run three 850-3, 850-4 and 850-5 of the six instances, while the other three instances 850-1, 850-2 and 850-6 are shut down. Each of the closed instances displays a click-to-play icon.

FIG. 8B illustrates the six instances 850-1, . . . , 850-6 of the media player program loaded on the webpage, at a later time T2. A user tapped on the click-to-play icon of the top right corner instance 850-2 of the media player program, sometime between T1 and T2. At time T2, four instances 850-2, 850-3, 850-4 and 850-5 are running at the same time, while the remaining instances 850-1 and 850-6 are shut down. However, the medial player program does not have enough memory to run the four instances 850-2, 850-3, 850-4 and 850-5 at the same time, so one of the running instances is selected by the instance manager to be closed. The instance 850-2 that was clicked by the user has focus and, thus, has higher priority than the other running instances 850-3, 850-4 and 850-5. Therefore the focus instance 850-2 can not be selected for shutdown.

FIG. 8C illustrates the six instances 850-1, . . . , 850-6 of the media player program loaded on the webpage, at a later time T3. Three of the six instances 850-2, 850-3 and 850-5 are running at T3, while the other three instances 850-1, 850-4 and 850-6 are closed. Instance 850-4 was the last instance shut down by the instance manager.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some implementations, the systems and techniques disclosed in this specification can controllably manage multiple instances of a media player program to optimize the player's performance and to keep computing resources within given limits. The disclosed methods include establishing a priority sequence based on logic embedded within the media player program. The media player program running inside a browser program can manage its own computing resources rather than having the browser program control the computing resources needed to run multiple instances. The priority sequence can be reestablished/changed as new factors may be introduced. For example in some implementations, tab priority can be added to the established priority sequence if the browser program that hosts the media player program supports tabs.

In some implementations, the actions taken to reduce memory consumption, processor usage and battery power, may vary over time. In some cases, an instance manager can suspend an instance rather than shut it down. In some other cases, the instance manager may switch at least a portion of the instances of the media player to a low resources state (e.g., one or more of player instances my be suspended when a backlight of a mobile device is turned to low or off.) In some implementations, a memory manager and an instance manager can synchronously release computer resources from the multiple active and inactive instances of a media player program for optimizing the player's performance and for keeping computing resources within given limits. In a multiple process environment, inter-process messaging can be added to logic executed by an instance manager to perform the methods disclosed in this specification.

What is claimed is:

1. A method comprising:
   monitoring consumption of computing resources of multiple running instances of a media player program to render respective media content in a graphical user interface of a computing device, the graphical user interface associated with an additional program configured to render additional content, different from the media content, to the graphical user interface;
   upon determining that a requested increase in computer resources consumption of the media player program would cause the computer resources consumption of the media player program to exceed a first predetermined level,
   identifying instances from among the multiple running instances for immediate reduction of respective portions of the computing resources consumption,
   flagging other instances from among the multiple running instances for subsequent reduction of respective other portions of the computing resources consumption, and
   instructing the identified instances and the flagged instances to reduce corresponding portions of the computing resources consumption; and
   upon determining that the consumption of the computer resources, after accounting for the instructed reductions and for the requested increase, is above the first predetermined level, selecting one or more of the multiple running instances for shut down,
   wherein a new consumption of the computing resources of one or more remaining running instances of the media player program after shutting down the selected instances would be below the first predetermined level, and
   wherein said selecting is performed according to one or more rules designed to maximize a number of presentations of the respective media content rendered in the graphical user interface.

2. The method of claim 1, further comprising shutting down the selected one or more instances, such that the new computing resources consumption is below the first predetermined level.

3. The method of claim 2, further comprises determining that the consumption of the computer resources, after accounting for the instructed reductions and for the requested increase, is below a second predetermined level, wherein said shutting down comprises sequentially shutting down one instance at a time from the selected instances until the new computing resources consumption is below the first predetermined level.

4. The method of claim 1, wherein:
   said selecting comprises:
   (i) determining paused instances of the media player program that are loaded in background, and selecting the determined instances, wherein the background includes portions of the graphical user interface not visible on a display screen; then
   (ii) determining un-paused instances of the media player program running in the background, and selecting the determined instances; then
   (iii) determining priority instances of the media player program running in the background, and selecting the determined instances, wherein a priority instance of the media player has a priority assigned by the additional program; then
   (iv) determining a focus instance of the media player program running in the background, and selecting the determined instance, wherein the focus instance represents an instance of the media player program which has received most recently an instruction via the graphical user interface; then
   (v) determining helper instances of the media player program running in the background, and selecting the determined instances, wherein the helper instances are configured to assist said running of other instances from the multiple instances; then
   (vi) determining paused instances of the media player program that are loaded in foreground, and selecting the determined instances, wherein the foreground includes portions of the graphical user interface being visible; then
   (vii) determining un-paused instances of the media player program running in the foreground, and selecting the determined instances; then
   (viii) determining priority instances of the media player program running in the foreground, and selecting the determined instances; then
   (ix) determining a focus instance of the media player program running in the foreground, and selecting the determined instance; then
   (x) determining helper instances of the media player program running in the foreground, and selecting the determined instances; and
   performing said sequentially shutting down one instance at a time in order of instance selection.

5. The method of claim 1, wherein said shutting down comprises:
presenting graphical indications of a portion of the shut-down instances.

6. The method of claim 5, wherein said presenting graphical indications comprises:
displaying a proxy icon in place of a shutdown instance of the media player program.

7. The method of claim 1, wherein said shutting down further comprises:
displaying a click-to-play icon of a shut-down instance.

8. The method of claim 1, wherein the additional program is a browser.

9. A data processing system comprising:
a data storage device to store one or more rules for managing consumption of computing resources by multiple running instances of a media player program configured to render respective media content in a graphical user interface of the data processing system;
the graphical user interface being associated with an additional program configured to render additional content, different from the media content, to the graphical user interface; and
one or more hardware processors communicatively coupled with the data storage device and configured to perform operations comprising:
monitoring the consumption of computing resources of the multiple running instances of the media player program;
upon determining that a requested increase in computing resources consumption of the media player would cause the computing resources consumption of the media player to exceed a first predetermined level,
identifying instances from among the multiple running instances for immediate reduction of respective portions of the computing resources consumption,
flagging other instances from among the multiple running instances for subsequent reduction of respective other portions of the computing resources consumption, and
instructing the identified instances and the flagged instances to reduce corresponding portions of the computing resources consumption; and
upon determining that the consumption of the computer resources, after accounting for the instructed reductions and for the requested increase, is above the first predetermined level, selecting one or more of the multiple running instances for shut down,
wherein a new consumption of the computing resources of one or more remaining running instances of the media player program after shutting down the selected instances would be below the first predetermined level, and
wherein the selecting operation is performed according to the stored one or more rules.

10. The system of claim 9, wherein the operations further comprise shutting down the selected one or more instances, such that the new computing resources consumption is below the first predetermined level.

11. The system of claim 10, wherein
the operations further comprise determining that the consumption of the computer resources, after accounting for the instructed reductions and for the requested increase, is below a second predetermined level, and
said shutting down comprises sequentially shutting down one instance at a time from the selected instances until the new computing resources consumption is below the first predetermined level.

12. The system of claim 9, wherein said selecting operation comprises
(i) determining paused instances of the media player program that are loaded in background, and selecting the determined instances, wherein the background includes portions of the graphical user interface not visible on a display screen; then
(ii) determining un-paused instances of the media player program running in the background, and selecting the determined instances; then
(iii) determining priority instances of the media player program running in the background, and selecting the determined instances, wherein a priority instance of the media player has a priority assigned by the additional program; then
(iv) determining a focus instance of the media player program running in the background, and selecting the determined instance, wherein the focus instance represents an instance of the media player program which has received most recently an instruction via the graphical user interface; then
(v) determining helper instances of the media player program running in the background, and selecting the determined instances, wherein the helper instances are configured to assist running of other instances from the multiple instances; then
(vi) determining paused instances of the media player program that are loaded in foreground, and selecting the determined instances, wherein the foreground includes portions of the graphical user interface being visible; then
(vii) determining un-paused instances of the media player program running in the foreground, and selecting the determined instances; then
(viii) determining priority instances of the media player program running in the foreground, and selecting the determined instances; then
(ix) determining a focus instance of the media player program running in the foreground, and selecting the determined instance; then
(x) determining helper instances of the media player program running in the foreground, and selecting the determined instances; and
wherein the one or more hardware processors are further configured to perform operations comprising carrying out said sequentially shutting down one instance at a time in order of instance selection.

13. The system of claim 9, wherein said shutting down operation comprises displaying corresponding proxy icons in place of at least a portion of the shutdown instances.

14. The system of claim 9, wherein the additional program is a browser.

15. The system of claim 9, wherein the computing resources comprise one or more of (i) memory available to the multiple running instances of the media player program, and (ii) power of the one or more hardware processors consumed by the multiple running instances of the media player program.

16. A computer storage medium encoded with a computer program, the program comprising instructions that when executed by data processing apparatus cause the data processing apparatus to perform operations comprising:
monitoring consumption of computing resources of multiple running instances of a media player program to render respective media content in a graphical user interface of a mobile device, the graphical user interface associated with an additional program configured to render additional content, different from the media content, to the graphical user interface;

instructing a first group of instances from among the multiple running instances to reduce respective portions of the computing resources consumption in response to determining that a requested increase in computing resources consumption of the media player program would cause the computer resources consumption of the media player program to exceed a first predetermined level, and flagging other instances from among the multiple running instances to subsequently reduce corresponding computer resources consumption;

allocating the requested increase in computer resources consumption in response to determining that the computer resources consumption would be less than the first predetermined level after accounting for the instructed reduction of the first group of instances;

selecting one or more instances to be shut down among the multiple instances in response to determining that a new computer resources consumption, after accounting for the instructed reductions of the first group of instances and of the flagged instances and for the allocation, is greater that the first predetermined level and smaller than a second predetermined level; and shutting down at least a portion of the selected instances to bring the computing resources consumption below the first predetermined level.

17. The computer storage medium of claim 16, wherein the operation of shutting down comprises sequentially shutting down one instance at a time from the multiple instances until the computing resources consumption is below the first predetermined level.

18. The computer storage medium of claim 17, wherein the operation of selecting is performed according with one or more rules designed to maximize a number of presentations of the respective media content rendered in the graphical user interface, such that the operation of selecting comprises:

(i) determining paused instances of the media player program that are loaded in background, and selecting the determined instances, wherein the background includes portions of the graphical user interface not visible on a display screen; then (ii) determining un-paused instances of the media player program running in the background, and selecting the determined instances; then (iii) determining priority instances of the media player program running in the background, and selecting the determined instances, wherein a priority instance of the media player has a priority assigned by the additional program; then (iv) determining a focus instance of the media player program running in the background, and selecting the determined instance, wherein the focus instance represents an instance of the media player program which has received most recently an instruction via the graphical user interface; then (v) determining helper instances of the media player program running in the background, and selecting the determined instances, wherein the helper instances are configured to assist said running of other instances from the multiple instances; then (vi) determining paused instances of the media player program that are loaded in foreground, and selecting the determined instances, wherein the foreground includes portions of the graphical user interface being visible; then (vii) determining un-paused instances of the media player program running in the foreground, and selecting the determined instances; then (viii) determining priority instances of the media player program running in the foreground, and selecting the determined instances; then (ix) determining a focus instance of the media player program running in the foreground, and selecting the determined instance; then (x) determining helper instances of the media player program running in the foreground, and selecting the determined instances; and performing said sequentially shutting down one instance at a time in order of instance selection.

19. The computer storage medium of claim 17, wherein the additional program is a browser.

20. The computer storage medium of claim 16, wherein the operation of shutting down comprises presenting graphical indications of a portion of the shutdown instances.

21. The computer storage medium of claim 20, wherein the operation of presenting graphical indications comprises displaying a proxy icon in place of a shutdown instance of the media player program.

22. The computer storage medium of claim 20, wherein the operation of shutting down comprises displaying a click-to-play icon of a shut-down instance.

* * * * *